(12) United States Patent
Sugiura et al.

(10) Patent No.: US 10,896,074 B2
(45) Date of Patent: Jan. 19, 2021

(54) INTERACTIVE PROCESSING DEVICE AND INTERACTIVE PROCESSING SYSTEM

(71) Applicants: KABUSHIKI KAISHA TOSHIBA, Minato-ku (JP); TOSHIBA DIGITAL SOLUTIONS CORPORATION, Kawasaki (JP)

(72) Inventors: Chikashi Sugiura, Hamura (JP); Junya Sasaki, Kodaira (JP); Tetsuya Gotou, Minato (JP); Kenta Cho, Kawasaki (JP); Hiroyuki Tanaka, Chigasaki (JP); Masaru Suzuki, Kawasaki (JP)

(73) Assignees: KABUSHIKI KAISHA TOSHIBA, Minato-ku (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 16/811,197

(22) Filed: Mar. 6, 2020

(65) Prior Publication Data
US 2020/0210253 A1 Jul. 2, 2020

Related U.S. Application Data

(63) Continuation of application No. PCT/JP2018/035497, filed on Sep. 25, 2018.

(30) Foreign Application Priority Data

Sep. 28, 2017 (JP) ................................. 2017-187858

(51) Int. Cl.
*G06F 9/54* (2006.01)
*G06F 9/451* (2018.01)
(Continued)

(52) U.S. Cl.
CPC .............. *G06F 9/543* (2013.01); *G06F 9/451* (2018.02); *G10L 13/00* (2013.01); *G10L 15/22* (2013.01);
(Continued)

(58) Field of Classification Search
None
See application file for complete search history.

(56) References Cited

FOREIGN PATENT DOCUMENTS

JP 2007-264198 A 10/2007

*Primary Examiner* — Craig C Dorais
(74) *Attorney, Agent, or Firm* — Oblon, McClelland, Maier & Neustadt, L.L.P.

(57) ABSTRACT

An interactive processing device according to an embodiment acquires one/more items' information for predetermined operation through interaction with a user, and includes one/more itemized-processing-units and an interaction-control-unit. The itemized-processing-units corresponds to the items. The interaction-control-unit controls the interaction collaboratively with the itemized-processing-units. The interaction-control-unit transmits user-input information to each itemized-processing-unit. Each itemized-processing-unit extracts a candidate for to-be-acquired information and transmits the candidate to the interaction-control-unit with likelihood information of being the to-be-acquired information. The interaction-control-unit determines a candidate having first-threshold-satisfying likelihood as information of an item corresponding to the candidate-transmitted itemized-processing-unit. When undetermined information item exists, the interaction-control-unit outputs inquiry for the item information. Each itemized-processing-unit is implemented by a general-purpose processor given corresponding-item name and an operation-parameter determining each itemized-processing-unit's operation. The general-purpose processing unit has a basic rule for extracting the candidate and calculating the (Continued)

likelihood using interactive knowledge corresponding to the to-be-acquired information type.

9 Claims, 10 Drawing Sheets

(51) Int. Cl.
*G10L 15/22* (2006.01)
*G10L 13/00* (2006.01)
*G10L 15/26* (2006.01)

(52) U.S. Cl.
CPC ........ *G10L 15/26* (2013.01); *G10L 2015/223* (2013.01)

| ITEM NUMBER | TYPE | ITEM NAME |
|---|---|---|
| 01 | DATE AND TIME | VISITING DATE AND TIME |
| 02 | OPTION | VISITING DESTINATION |
| 03 | DATE AND TIME | NEXT SCHEDULED DATE |
| 04 | FREE DESCRIPTION | SPECIAL NOTES |

INTERACTIVE PROCESSING DEVICE AND INTERACTIVE PROCESSING SYSTEM

CROSS-REFERENCE TO RELATED APPLICATIONS

This application is a continuation of PCT International Application No. PCT/JP2018/035497 filed on Sep. 25, 2018 which claims the benefit of priority from Japanese Patent Application No. 2017-187858, filed on Sep. 28, 2017, the entire contents of which are incorporated herein by reference.

FIELD

Embodiments described herein relate generally to an interactive processing device and an interactive processing system.

BACKGROUND

Conventionally, there are known interactive processing devices that interact with a user based on interaction scenarios. Such a kind of interactive processing device can realize interactive processing in accordance with a purpose by devising the interaction scenarios, however a huge amount of interaction scenarios are required to flexibly cope with variation of diverse interactions. Typically, the interaction scenario is individually created along the flow of a series of interactions for achieving a predetermined purpose. As such, it is difficult to allow the created interaction scenario to have versatility. Due to this, there is the problem that a lot of labor works are required to devise the interaction scenarios for realizing interactive processing, and there has been a demand for a mechanism that can realize interactive processing for achieving a given purpose with a simpler configuration.

An object of the embodiments herein is to provide an interactive processing device and an interactive processing system that can implement interactive processing for achieving a predetermined purpose with a simple configuration.

BRIEF DESCRIPTION OF THE DRAWINGS

FIG. 2 is a diagram illustrating an example of a slot table;

FIG. 3 is a diagram illustrating an example of table information;

DETAILED DESCRIPTION

Figure 1:
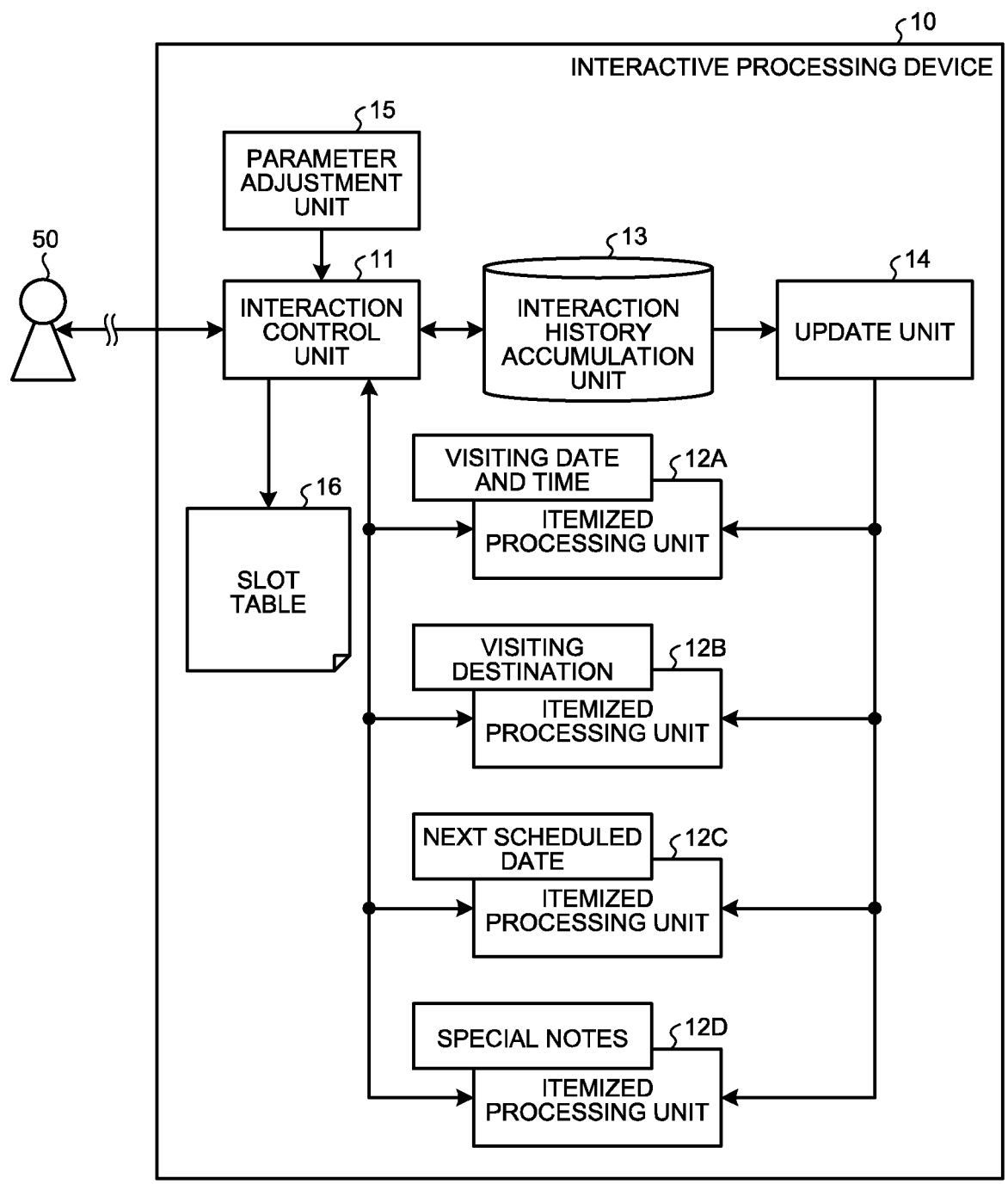
FIG. 1 is a functional block diagram illustrating a configuration example of an interactive processing device according to a first embodiment.

An interactive processing device according to an embodiment is configured to acquire information of one or more items for performing a predetermined operation through an interaction with a user and includes one or more hardware processors configured to function as one or more itemized processing units and an interaction control unit. The itemized processing units corresponds to the one or more items, respectively. The interaction control unit is configured to control the interaction with the user collaboratively with the one or more itemized processing units. The interaction control unit transmits input information corresponding to an input from the user to each of the one or more itemized processing units. Each of the one or more itemized processing units extracts a candidate for information that is to be acquired by the each itemized processing unit from the input information received from the interaction control unit, and transmits the extracted candidate to the interaction control unit with information indicating a degree of likelihood that the extracted candidate is the information that is to be acquired. The interaction control unit determines, among a plurality of candidates received from each of the one or more itemized processing units, a candidate having the degree of likelihood that satisfies a first threshold (standard) as information of an item corresponding to the itemized processing unit that has transmitted the candidate. When there is an item of undetermined information, the interaction control unit outputs, to the user, a response for inquiring the information of the item. Each of the one or more itemized processing units is implemented by a general-purpose processing unit given an item name of a corresponding item and an operation parameter that determines an operation of the each itemized processing unit, the general-purpose processing unit having a basic rule for extracting the candidate and calculating the degree of likelihood based on interactive knowledge corresponding to a type of the information that is to be acquired. The following describes an interactive processing device and an interactive processing system according to an embodiment in detail with reference to the drawings.

Outline of Embodiment

The interactive processing device according to the embodiments is an interactive processing device of a type for achieving a purpose that is used by a user with a definite purpose, and acquires information of one or more items for performing a predetermined operation corresponding to the purpose through interactions with the user. For example, when the purpose is "recording a business talk", the interactive processing device acquires information of items such as "visiting date and time", "visiting destination", "next scheduled date", and "special notes" through interactions with the user. When the purpose is "reserving accommodation", information that is to be acquired is information of items such as "scheduled date and time for check-in", "scheduled date and time for check-out", "number of guests", and "accommodation plan", and when the purpose is "searching for a route" by a car navigation system, information that is to be acquired is information of items such as "destination" and "whether to use a toll road". In the following description, the information that is to be acquired is information of a plurality of items, but the information that is to be acquired may be information of one item.

The interactive processing device according to the embodiments uses a slot table to perform a predetermined operation corresponding to a purpose. The slot table includes a plurality of slots corresponding to respective items. Pieces of information that is acquired through an interaction (an item value) are input to the corresponding slots. When all of the slots in the slot table are filled, a predetermined operation corresponding to the purpose is performed based on the slot table. The predetermined operation corresponding to the purpose is, for example, an operation of registering a record of a business talk in a database when the purpose is "recording a business talk". When the purpose is "reserving accommodation", the predetermined operation corresponding to the purpose is to execute a query for reserving accommodation, and when the purpose is "searching for a route", the predetermined operation corresponding to the purpose is to perform processing of searching for a route from a present location to a destination. Even if all of the slots in the slot table are not filled, the predetermined operation may be performed at the time when slots corresponding to respective items required for performing the predetermined operation are filled.

In the embodiments, basically, there is provided a small part (referred to as an "itemized processing unit" in the embodiments) that individually performs processing for acquiring each piece of information of the items corresponding to the respective slots in the slot table described above, and a plurality of the itemized processing units corresponding to the respective items are combined to implement interactive processing. The interactive processing device according to the embodiments includes the itemized processing units, and an interaction control unit that cooperates with the itemized processing units to control interactions with the user. The interaction control unit controls an interaction with the user while cooperating with the itemized processing units so that information can be input to each of the slots in the slot table described above.

The information of each item that is to be acquired by the interactive processing device according to the embodiments can be classified into a type corresponding to an attribute of the item. For example, in the example in which the purpose is "recording a business talk" described above, when the item is "visiting date and time" or "next scheduled date", the information that is to be acquired is a date and time, so that the type of the information is a date/time type. When the item is "visiting destination", the information that is to be acquired is a company name and the like selected from some options, so that the type of the information is an option type. When the item is "special notes", the information that is to be acquired is optional information with no limitation, so that the type of the information is free description type. Processing for acquiring such information can be generalized in some degree in accordance with the type of the information. Thus, in the embodiments, a general-purpose processing unit defining general-purpose processing corresponding to the type of information that is to be acquired is prepared in advance for each type, and the itemized processing unit described above is implemented by the customized general-purpose processing unit.

In the embodiments, as described above, a plurality of itemized processing units are implemented by the general-purpose processing units that are customized and prepared in advance for the respective types of information that is to be acquired, and the interactive processing device is implemented by the combination of the itemized processing units. This construction makes it possible to perform appropriate interactive processing without performing complicated work such as creating a large amount of interaction scenarios in accordance with a purpose to be achieved, unlike a conventional interactive processing device that performs interactive processing based on interaction scenarios, thereby implementing interactive processing for achieving a predetermined purpose with a simple configuration. The following describes a specific configuration example and an operation of the interactive processing device according to the embodiments by exemplifying a case in which the purpose to be achieved is "recording a business talk".

First Embodiment

FIG. 1 is a functional block diagram illustrating a configuration example of an interactive processing device 10 according to a first embodiment. As illustrated in FIG. 1, the interactive processing device 10 according to the first embodiment includes a combination of an interaction control unit 11 and a plurality of itemized processing units 12A, 12B, 12C, and 12D (hereinafter, referred to as an "itemized processing unit 12" in a case in which these itemized processing units are not distinguished from each other) as a basic unit for implementing interactive processing with a user 50. The interactive processing device 10 performs interactive processing with the user 50 to acquire information to be input to each of the slots in a slot table 16.

FIG. 2 illustrates an example of the slot table 16. As illustrated in FIG. 2, the slot table 16 includes a plurality of slots 17A, 17B, 17C, and 17D (hereinafter, referred to as a "slot 17" in a case in which these slots are not distinguished from each other) that are identified with item numbers (01, 02, 03, and 04 in the drawing). The slots 17 correspond to a plurality of items corresponding to a purpose to be achieved. In the first embodiment, the purpose to be achieved is "recording a business talk", and information required for registering a record of a business talk in a database is information of items "visiting date and time", "visiting destination", "next scheduled date", and "special notes". Due to this, the slot table 16 is created that includes the slot 17A having the item number 01 to which the information "visiting date and time" is input, the slot 17B having the item number 02 to which the information "visiting destination" is input, the slot 17C having the item number 03 to which the information "next scheduled date" is input, and the slot 17D having the item number 04 to which the information "special notes" is input.

The slot table 16 is created at the time when interactive processing with the user 50 is started, and information that is acquired through an interaction with the user is input to the slot table 16 as needed. With all slots 17 filled, a predetermined operation corresponding to the purpose is performed, and the slot table 16 is deleted. That is, the slot table 16 is a temporary table that is created every time a series of interactive processing with the user 50 is performed for achieving the purpose. The slot table 16 is created based on table information that is permanently held within the interactive processing device 10. In the above-described mechanism, the slot table 16 is created based on the table information that is permanently held within the interactive processing device 10 as occasion demands, but the embodiment is not limited thereto. The created slot table 16 may be held in a table format instead of being deleted.

FIG. 3 illustrates an example of table information 18. As illustrated in FIG. 3, the table information 18 is information that defines an item number, a type of information, and an item name for each of the items the information of which is to be acquired to perform a predetermined operation corresponding to the purpose. The table information 18 illustrated in FIG. 3 determines information to be input to each of the slots 17 in the slot table 16 illustrated in FIG. 2. That is, based on the table information 18 illustrated in FIG. 3, it is determined that information of a date/time type is input as information of the item having the item name "visiting date and time" to the slot 17A that is identified with the item number 01 in the slot table 16, information of an option type is input as information of the item having the item name "visiting destination" to the slot 17B identified with the item number 02, information of date/time type is input as information of the item having the item name "next scheduled date" to the slot 17C identified with the item number 03, and information of free description type is input as information of the item having the item name "special notes" to the slot 17D identified with the item number 04.

For example, the table information 18 described above is input by a device constructor at the time of constructing the interactive processing device 10 corresponding to the purpose, and is permanently held within the interactive processing device 10. At the time of starting interactive processing with the user 50, the slot table 16 is created by referring to the table information 18. The table information 18 is also used as information for constructing a plurality of the itemized processing units 12 corresponding to the respective items. Additionally, in a case in which the interaction control unit 11 outputs a response to the user 50 as described later, the table information 18 is referred to.

The interaction control unit 11 controls the interaction with the user 50 while cooperating with the itemized processing units 12. The interaction control unit 11 has a role of organizing the itemized processing units 12 that independently operate, and acquiring information to be input to each of the slots 17 in the slot table 16 from input text corresponding to an input from the user 50.

Specifically, the interaction control unit 11 receives the input from the user 50, and transmits input information corresponding to the input from the user 50 to each of the itemized processing units 12. In the following description, the input information is text (input text), but the embodiment is not limited thereto. In a case in which the input information corresponding to the input from the user 50 is text, the input from the user 50 may be voice acquired with a microphone, or may be text input with a keyboard and the like. If the input from the user 50 is text, the interaction control unit 11 directly transmits the text input by the user 50 as input text to each of the itemized processing units 12. In a case in which the input from the user 50 is voice, the interaction control unit 11 converts the voice into text through voice recognition processing, and transmits the obtained text as input text to each of the itemized processing units 12. The configuration may be such that the voice recognition processing is performed on the voice input by the user 50 on the outside of the interaction control unit 11, and the interaction control unit 11 receives the text converted from the voice. The voice recognition processing can be performed by using a known technique, so that detailed description thereof is omitted.

Subsequently, the interaction control unit 11 receives candidates and scores (described later) transmitted from each of the itemized processing units 12. If a candidate having the score equal to or larger than a first threshold (candidate satisfying a first threshold), the interaction control unit 11 determines the candidate to be information of the item corresponding to the itemized processing unit 12 that has transmitted the candidate, and inputs the information to the slot 17 of the corresponding item in the slot table 16. For example, if the score of the candidate transmitted from the itemized processing unit 12A corresponding to the item having the item name "visiting date and time" is equal to or larger than the first threshold, the interaction control unit 11 determines the candidate transmitted from the itemized processing unit 12A to be information of the item having the item name "visiting date and time", and inputs the information to the slot 17A in the slot table 16. The score is an example of information indicating a degree of likelihood that the extracted candidate is the information that is to be acquired, and information other than the score may be used. For example, the information is not limited to information represented by numerical values such as the score, and a label indicating a degree of likelihood that the candidate is the information that is to be acquired (for example, labels such as "reliable", "ambiguous", and "irrelevant") and the like can also be used. In this case, the candidate having the label "reliable" is a candidate satisfying the first threshold, and the candidate having the label "ambiguous" is a candidate not satisfying the first threshold but satisfying a second threshold (standard).

In a case in which the slot table 16 has a slot 17 to which information is not input, that is, the information of an item, which is to be input to the slot 17, is not determined, the interaction control unit 11 outputs a response for inquiring the information of the item to the user 50. For example, when the input from the user 50 is text, the interaction control unit 11 generates response text for inquiring undetermined information of the item, and causes the response text to be displayed on a display device used by the user 50. When the input from the user 50 is voice, the interaction control unit 11 converts the generated response text into voice through voice synthesis processing, and causes the obtained voice to be output from a speaker used by the user 50. The configuration may be such that the voice synthesis processing is performed on the response text on the outside of the interaction control unit 11, and the voice is output from the speaker used by the user 50. The voice synthesis processing can be performed by using a known technique, so that detailed description thereof is omitted.

The response text for inquiring undermined information of an item can be generated, for example, by preparing general-purpose response text such as "What is xxx?" serving as a base, and inserting the item name the information of which is not determined to a portion "xxx". For example, when the information of the item having an item name "next scheduled date" is not determined, response text such as "What is the next scheduled date?" can be generated by inserting a phrase "next scheduled date" into the response text serving as a base. Alternatively, for example, response text serving as a base specific to the date/time type such as "When is xxx?" may be individually prepared, and when the information to be inquired is the date/time type, the response text such as "When is the next scheduled date?" may be generated by selecting the response text and inserting the item name thereto. In a case in which a plurality of items have information that is not determined, the interaction control unit 11 outputs, to the user 50, a response for inquiring the information of the items in ascending order of numbers of the items, for example.

In a case of receiving a candidate having the score that is smaller than the first threshold and equal to or larger than a second threshold (candidate not satisfying the first threshold and satisfying the second threshold) from any one of the itemized processing units 12 (where the first threshold>the second threshold), the interaction control unit 11 outputs, to the user 50, a response for inquiring whether the candidate is correct. In this case, for example, the response text can be generated by preparing general-purpose response text serving as a base such as "Is xxx yyy?", inserting the item name as a target of inquiry into a portion "xxx", and inserting the candidate as a target of inquiry to a portion "yyy". For example, in a case in which the candidate received from the itemized processing unit 12B corresponding to the item having the item name "visiting destination" is "Yamashita Industrial Company", and the score of the candidate is smaller than the first threshold and equal to or larger than the second threshold, response text "Is visiting destination Yamashita Industrial Company?" can be generated by inserting "visiting destination" and "Yamashita Industrial Company" to the response text serving as a base.

In a case of outputting, to the user 50, the response for inquiring whether the candidate received from the itemized processing unit 12 is correct, and the input text corresponding to the next input from the user 50 includes affirmative expression such as "Yes" or "Correct", for example, the interaction control unit 11 determines the candidate serving as a target of inquiry to be information corresponding to the item serving as a target of inquiry, and inputs the information to the slot 17 of the corresponding item in the slot table 16. In contrast, in a case in which the input text corresponding to the next input from the user 50 includes negative expression such as "No" or "Incorrect", for example, or does not include either of affirmative expression and negative expression, the interaction control unit 11 transmits the input text to the itemized processing unit 12 corresponding to the item serving as a target of inquiry, and stands by until the candidate and the score thereof is transmitted again from the itemized processing unit 12. The input text may be transmitted to all of the itemized processing units 12, not limited to the itemized processing unit 12 corresponding to the item as a target of inquiry. In a case in which candidates having the score that is smaller than the first threshold and equal to or larger than the second threshold are transmitted from the itemized processing units 12, for example, the interaction control unit 11 outputs, to the user 50, a response for inquiring whether the candidate is correct for the respective items in ascending order of numbers of the items.

The interaction control unit 11 repeats pieces of the processing described above until all of the slots 17 in the slot table 16 are filled, and when all of the slots 17 in the slot table 16 are filled, the interaction control unit 11 performs the predetermined operation corresponding to the purpose using the information input to each of the slots 17 in the slot table 16. In the first embodiment, the purpose to be achieved is "recording a business talk", so that the information "visiting date and time" input to the slot 17A in the slot table 16, the information "visiting destination" input to the slot 17B, the information "next scheduled date" input to the slot 17C, and the information "special notes" input to the slot 17D are registered in the database as one record of a business talk. The configuration may be such that the interaction control unit 11 performs processing until the information is input to each of the slots 17 in the slot table 16, and the predetermined operation corresponding to the purpose is performed by a unit different from the interaction control unit 11 based on the information input to each of the slots 17 in the slot table 16.

Each of the itemized processing units 12 receives the input text transmitted from the interaction control unit 11, extracts the candidate for the information that is to be acquired by each itemized processing unit 12 from the input text, and transmits the extracted candidate to the interaction control unit 11 together with the score indicating likelihood that the candidate is the information that is to be acquired. As described above, each of the itemized processing units 12 is implemented by the customized general-purpose processing unit corresponding to the type of information that is to be acquired by each itemized processing unit 12 among the general-purpose processing units that are prepared in advance for the respective types of information. The general-purpose processing unit has a basic rule of extracting the candidate and calculating the score based on interactive knowledge corresponding to the type of information that is to be acquired, and functions as the itemized processing unit 12 when the item name and an operation parameter that determines the operation of the itemized processing unit 12 are given thereto.

Figure 4:
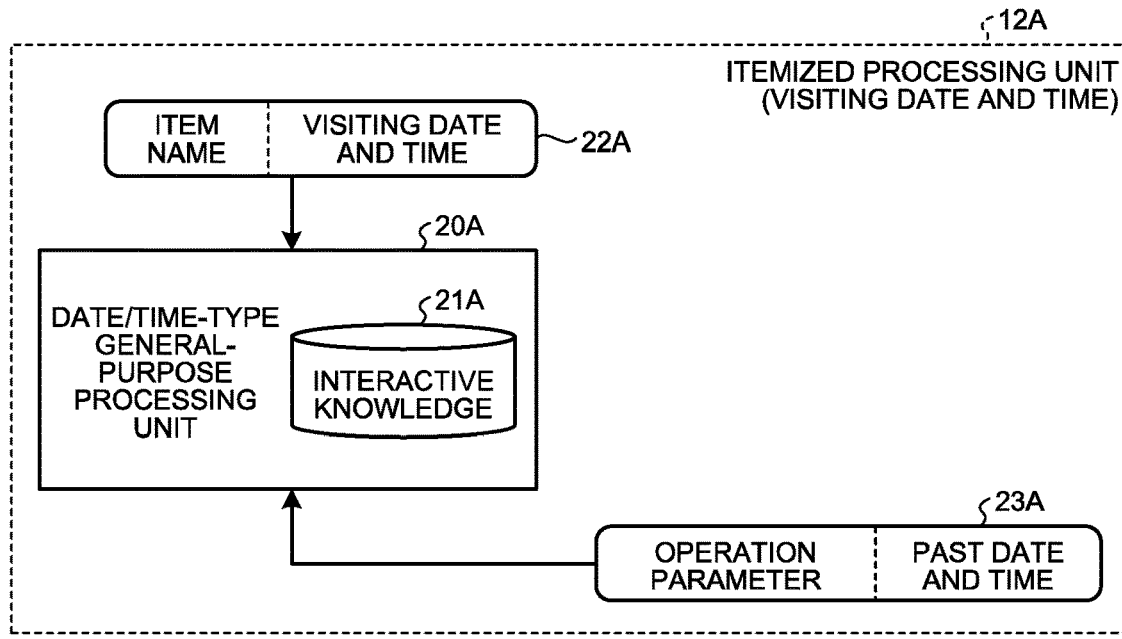
FIG. 4 is a diagram for explaining details of an itemized processing unit.

FIG. 4 is a diagram for explaining details of the itemized processing unit 12A corresponding to the item having the item name "visiting date and time". As illustrated in FIG. 4, the itemized processing unit 12A is implemented by a date/time-type general-purpose processing unit 20A given an item name 22A and an operation parameter 23A. The date/time-type general-purpose processing unit 20A is a general-purpose processing unit corresponding to date/time-type information. The item name 22A is "visiting date and time", and the operation parameter 23A is a condition for acquiring information "past date and time" because the information that is to be acquired by the itemized processing unit 12A is the visiting date and time serving as the past date and time.

The date/time-type general-purpose processing unit 20A extracts portions that are estimated to represent a date and time from the input text as candidates based on interactive knowledge 21A, calculates the score indicating likelihood that each of the extracted candidates represents a date and time for each candidate, and outputs the candidate having the highest score together with the score. The interactive knowledge 21A includes an operation flow of the date/time-type general-purpose processing unit 20A, a rule for calculating the score, a list of character strings representing a date and time, a rule for converting the character string representing a date and time into a numerical string in a predetermined format, and the like. For example, in a case in which the input text includes a character string "15 o'clock today", the date/time-type general-purpose processing unit 20A converts the character string "15 o'clock today" into a numerical string in a predetermined format "2017/06/26 15:00" based on the interactive knowledge 21A. The interactive knowledge 21A may include a rule such that, in a case in which a character string representing a date and time is included in the input text together with the item name 22A, the score of the character string (candidate) is maximized.

The score can be calculated in accordance with a predetermined rule for calculating the score. For example, the score is calculated in accordance with a calculation rule of giving 0.7 as a base score in a case in which the input text includes part of the item name 22A, and adding 0.1 to the base score in a case in which the input text corresponds to the operation parameter 23A, and a case in which the input text includes the entire item name 22A. For example, when "I introduced yy to xx at 15 o'clock today" is input, "15 o'clock today" corresponds to the date and time as part of the item name 22A, so that 0.7 is given as the base score. The input "introduced" represents the past, so that "15 o'clock today" indicates the past date and time, which corresponds to the operation parameter 23A. Thus, 0.1 is added, and the score becomes 0.8. In contrast, in a case in which the entire item name 22A is included in the input text such as "visiting date and time is 15 o'clock today . . . " or "I visited xx at 15 o'clock today", 0.1 is further added, and the score becomes 0.9.

In a case in which the input text does not include the item name 22A, and does not correspond to the operation parameter 23A, the score is calculated based on similarity and the like between the character string of the input text and the item name 22A or information set to the operation parameter 23A instead of causing the score to be zero. In this case, it is preferable to set a score lower than the base score.

The date/time-type general-purpose processing unit 20A is, when having the item name 22A and the operation parameter 23A given thereto, customized to be the itemized processing unit 12A for acquiring the information "visiting date and time". With "past date and time" given as the operation parameter 23A being a condition for acquiring information, the itemized processing unit 12A extracts the candidate for "visiting date and time" from the input text, calculates the score representing likelihood that the candidate is "visiting date and time", and transmits the candidate having the highest score to the interaction control unit 11 together with the score.

Figure 5:
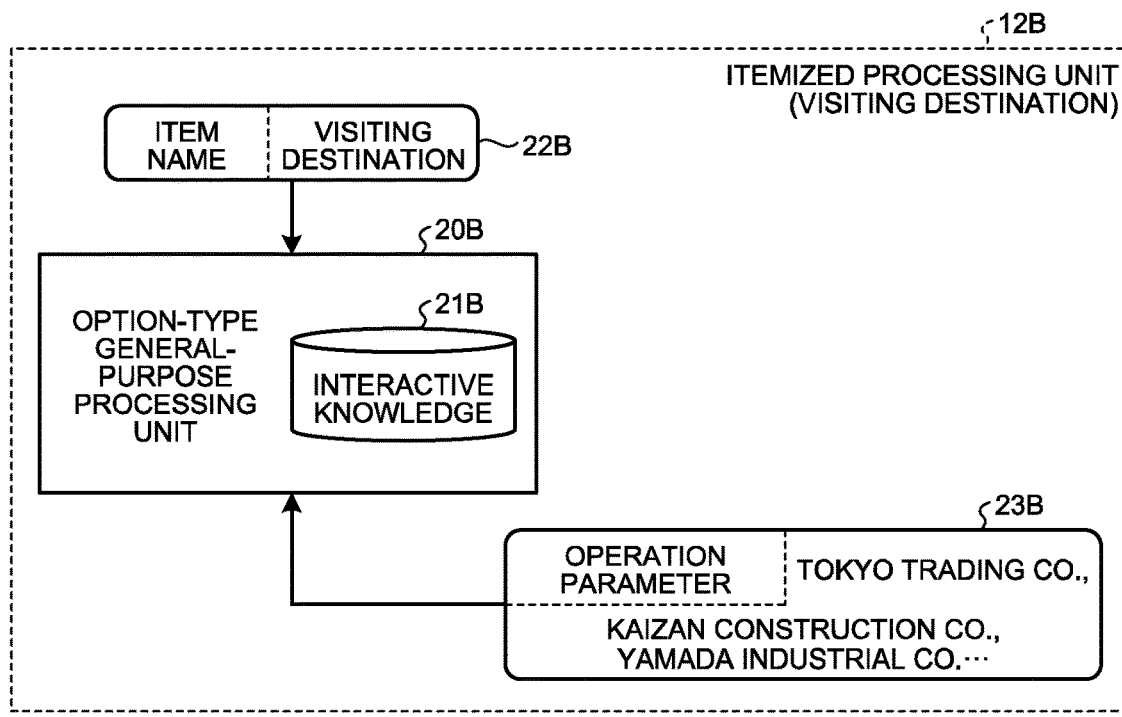
FIG. 5 is a diagram for explaining details of the itemized processing unit.

FIG. 5 is a diagram for explaining details of the itemized processing unit 12B corresponding to the item having the item name "visiting destination". As illustrated in FIG. 5, the itemized processing unit 12B is implemented by an option-type general-purpose processing unit 20B given an item name 22B and an operation parameter 23B. The option-type general-purpose processing unit 20B is a general-purpose processing unit corresponding to option-type information. The item name 22B is "visiting destination", and the operation parameter 23B is, for example, options such as "Tokyo Trading Company, Kaizan Construction Company, Yamada Industrial Company . . . " because information that is to be acquired by the itemized processing unit 12B is a company name and the like selected from among some options.

The option-type general-purpose processing unit 20B extracts, as the candidates, portions that are estimated to match any one of the options given as the operation parameter 23B from the input text based on interactive knowledge 21B, calculates the score indicating likelihood that each of the extracted candidates represents the option for each candidate, and outputs the candidate having the highest score together with the score. The interactive knowledge 21B includes an operation flow of the option-type general-purpose processing unit 20B, a rule for calculating the score, and the like. The interactive knowledge 21B may also include a rule such that, in a case in which the input text includes a character string that is estimated to match any one of the options given as the operation parameter 23B together with the item name 22B, the score of the character string (candidate) is maximized.

In a case in which the input text includes reading information (for example, in a case in which reading information obtained by performing voice recognition processing on voice input from the user 50 is added to the input text), the option-type general-purpose processing unit 20B may add the reading information to the option given as the operation parameter 23B, and extract the candidate from the input text by matching the reading information included in the input text with the reading information of the option.

The score can be calculated in accordance with a predetermined rule for calculating the score. For example, similarly to the case of the date/time type, the score can be calculated depending on whether the input text includes the item name 22B or the operation parameter 23B. For example, a calculation rule is established such that the base score (0.7) is given in a case in which the input text includes the operation parameter 23B, and the score is further added in a case in which the input text also includes the item name 22B. A result of matching using the reading information described above can also be reflected in the score. In this case, the score may be added in accordance with similarity in the reading information. For example, in a case in which the user 50 utters "A visiting destination is Kaizan Shoji" or "I visited Kaizan Shoji", and all recognition results are correct, "visiting destination" as the item name and "visit" as part of the item name are included therein, so that the score is added (+0.1). Additionally, "Kaizan Shoji" serving as the option set to the operation parameter 23B is included therein, so that the score is further added (+0.2). Score evaluation in relation to the operation parameter 23B can be performed, for example, based on matching between the option and a target character string, similarity in the reading information, a distance to the item name, and the like. The evaluation (a plus value of the score) can be set as appropriate.

In a case of the option type, similarly to the case of the date/time type, when the input text does not correspond to the item name 22B and the operation parameter 23B, the score can be calculated, instead of being set to zero, from relation with the information set to the item name 22B and the operation parameter 23B, based on part of the information, for example, such that only part of the reading information of the input text is similar to the information set to the item name 22B or the operation parameter 23B. In this case, it is preferable to set a score lower than the base score. Based on a similar way of thinking, a free description-type general-purpose processing unit 20D (described later) can also calculate the score in a case in which the input text does not correspond to the item name and the operation parameter.

The option-type general-purpose processing unit 20B is, when having the item name 22B and the operation parameter 23B given thereto, customized to be the itemized processing unit 12B for acquiring the information "visiting destination". The itemized processing unit 12B extracts, from the input text, character strings that are estimated to match any one of the options given as the operation parameter 23B, as candidates for "visiting destination", calculates the score representing likelihood that the candidate is "visiting destination", and transmits the candidate having the highest score to the interaction control unit 11 together with the score.

Figure 6:
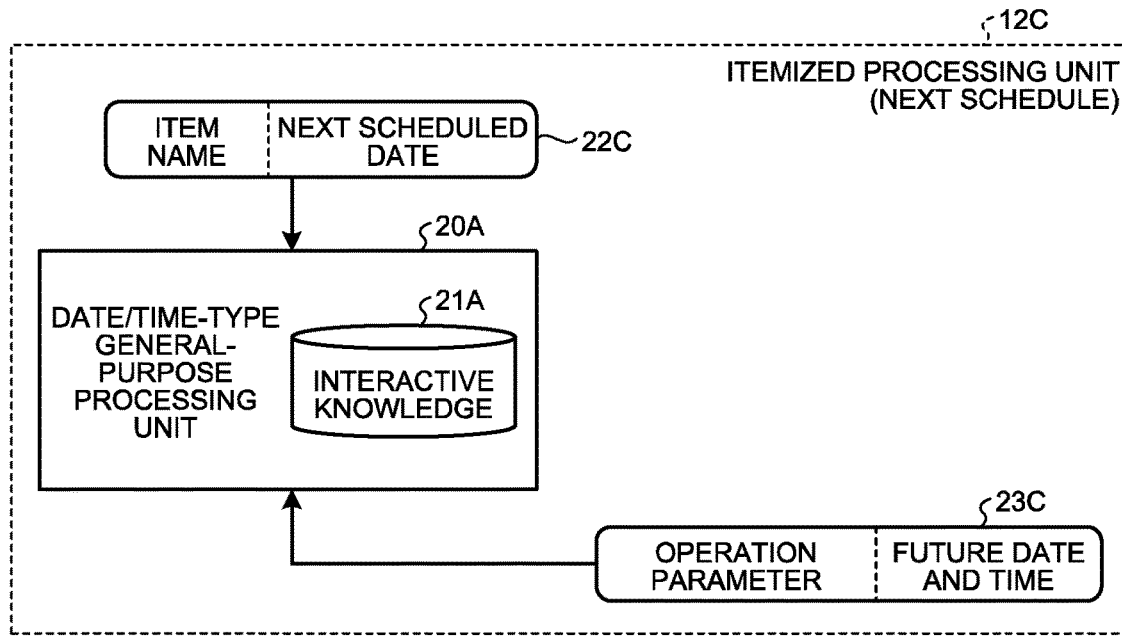
FIG. 6 is a diagram for explaining details of the itemized processing unit.

FIG. 6 is a diagram for explaining details of the itemized processing unit 12C corresponding to the item having the item name "next scheduled date". As illustrated in FIG. 6, the itemized processing unit 12C is implemented by the date/time-type general-purpose processing unit 20A given an item name 22C and an operation parameter 23C. The item name 22C is "next scheduled date", and the operation parameter 23C is a condition for acquiring information "future date and time" because the information that is to be acquired by the itemized processing unit 12C is the next scheduled date serving as the future date and time.

The date/time-type general-purpose processing unit 20A used for the itemized processing unit 12C is the same as the date/time-type general-purpose processing unit 20A used for the itemized processing unit 12A described above. The date/time-type general-purpose processing unit 20A extracts portions that are estimated to represent a date and time from the input text as the candidates, calculates the score indicating likelihood that each of the extracted candidates represents a date and time for each candidate, and outputs the candidate having the highest score together with the score. The date/time-type general-purpose processing unit 20A is, when having the item name 22C and the operation parameter 23C given thereto, customized to be the itemized processing unit 12C for acquiring information "next visiting date". With "future date and time" given as the operation parameter 23C being a condition for acquiring information, the itemized processing unit 12C extracts the candidate for "next scheduled date" from the input text, calculates the score representing likelihood that the candidate is "next scheduled date", and transmits the candidate having the highest score to the interaction control unit 11 together with the score.

Figure 7:
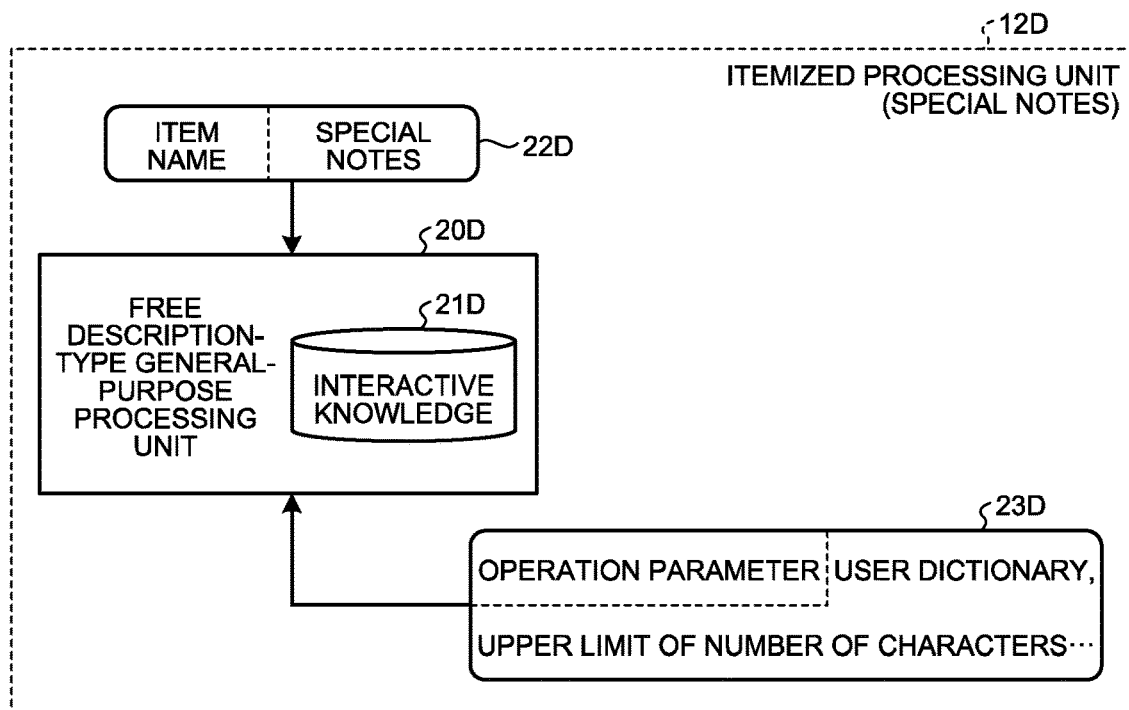
FIG. 7 is a diagram for explaining details of the itemized processing unit.

FIG. 7 is a diagram for explaining details of the itemized processing unit 12D corresponding to the item having the item name "special notes". As illustrated in FIG. 7, the itemized processing unit 12D is implemented by the free description-type general-purpose processing unit 20D given an item name 22D and an operation parameter 23D. The free description-type general-purpose processing unit 20D is a general-purpose processing unit corresponding to free description-type information. The item name 22D is "special notes", and the operation parameter 23D is a user dictionary defining technical terms and the like related to "recording a business talk", limitation on the number of characters of information to be input to the slot 17D corresponding to "special notes", and the like.

Based on interactive knowledge 21D, the free description-type general-purpose processing unit 20D extracts the candidates for the information to be input to the slot 17 corresponding to the item name from the input text, calculates the score indicating likelihood that the extracted candidate is the information to be input to the slot 17 corresponding to the item name, and outputs the candidate together with the score. The interactive knowledge 21D includes the operation flow of the free description-type general-purpose processing unit 20D, a rule for calculating the score, a rule of extracting a character string following an item name as the candidate and maximizing the score of the character string when the input text includes the item name, and the like.

The score can be calculated in accordance with a predetermined rule for calculating the score. For example, the score can be calculated depending on whether the input text includes the item name 22D. The score can be calculated in accordance with a calculation rule of giving the base score in a case in which the input text includes the item name 22D, and adding the score depending on an appearance position of the item name in the input text. For example, in a case in which the input text is "xxxxxx, special notes are yyy", "special notes" is included in the middle of the text, so that a portion "yyy" following "special notes" is extracted as free description content, and the base score (0.6) is given to the portion. In a case in which the item name is included at the head of the input text like "special notes are yyy", the score is added (+0.2). Also in a case of the free description type, similarly to the case of the date/time type or the option type, the reading information can also be reflected in the score, and the base score may be given because the item name 22D is included due to similarity in the reading information even if notation is different.

The free description-type general-purpose processing unit 20D is, when having the item name 22D and the operation parameter 23D given thereto, customized to be the itemized processing unit 12D for acquiring the information "special notes". The itemized processing unit 12D extracts, as the candidates, character strings the number of characters of which does not exceed the limitation from the input text using the user dictionary given as the operation parameter 23D, calculates the score representing likelihood that the candidate is "special notes", and transmits the candidate to the interaction control unit 11 together with the score.

As described above, each of the itemized processing units 12 included in the interactive processing device 10 according to the first embodiment is implemented by the general-purpose processing unit given the item name and the operation parameter, the general-purpose processing unit corresponding to the type of the information that is to be acquired by each itemized processing unit 12. The general-purpose processing unit to be used is prepared in advance in accordance with the type of information. Thus, when constructing the interactive processing device 10 according to the first embodiment, it is possible to construct the interactive processing device 10 that can perform appropriate interactive processing only by selecting the general-purpose processing unit corresponding to the type of information for each item required for performing the predetermined operation corresponding to the purpose, giving the item name and the operation parameter to the selected processing unit so as to construct the itemized processing unit 12, and providing the interaction control unit 11 that organizes a plurality of the itemized processing units 12.

In the first embodiment, the purpose to be achieved is "recording a business talk", so that the exemplified general-purpose processing units are the date/time-type general-purpose processing unit 20A corresponding to the date/time-type information, the option-type general-purpose processing unit 20B corresponding to the option-type information, and the free description-type general-purpose processing unit 20D corresponding to the free description-type information. However, by preparing general-purpose processing units corresponding to various types of information in advance, itemized processing units for acquiring information of respective items corresponding to various purposes can be easily implemented.

For example, by preparing the general-purpose processing unit corresponding to numerical-type information in advance, and giving "reserving accommodation" as the item name, "a unit (the number of persons), the number of significant digits, the upper limit and the lower limit" as the operation parameter, and the like to the general-purpose processing unit, the itemized processing unit for acquiring information "number of guests" that is required to achieve the purpose "reserving accommodation" can be implemented. By preparing the general-purpose processing unit corresponding to address-type information in advance, and giving "destination" as the item name, "address data, map data" as the operation parameter, and the like to the general-purpose processing unit, the itemized processing unit for acquiring information "destination" that is required to achieve the purpose "searching for a route" can be implemented.

Figure 8:
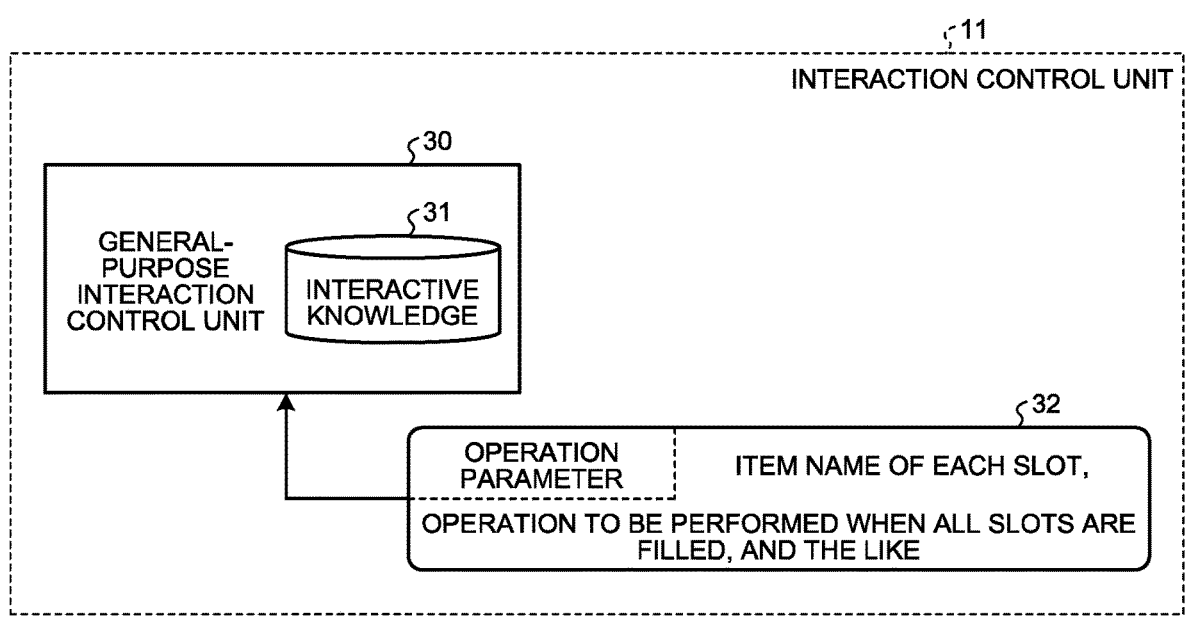
FIG. 8 is a diagram for explaining details of an interaction control unit.

The interaction control unit 11 may also be implemented by applying a mechanism similar to that of the itemized processing unit 12 to the interaction control unit 11 described above, and customizing the general-purpose interaction control unit having a basic rule of organizing the itemized processing units 12. FIG. 8 is a diagram for explaining details of the interaction control unit 11 thus implemented. As illustrated in FIG. 8, the interaction control unit 11 is implemented by a general-purpose interaction control unit 30 given an operation parameter 32.

The general-purpose interaction control unit 30 controls interactions with the user 50 based on interactive knowledge 31. The interactive knowledge 31 includes an operation flow of transmitting the input text to each of the itemized processing units 12, receiving the candidate together with the score, and inputting the candidate having the score equal to or larger than the first threshold to the corresponding slot 17 in the slot table 16, a rule for an interaction with the user, general-purpose response text serving as a base described above that is used for a response to the user 50, and the like. The general-purpose interaction control unit 30 is, when having the operation parameter 32 given thereto, customized to be the interaction control unit 11 corresponding to the purpose to be achieved by the interactive processing device 10. The operation parameter 32 is, for example, the item name corresponding to each of the slots 17 in the slot table 16, and an operation that is performed in a case in which all of the slots 17 are filled.

In the interactive processing device 10 according to the first embodiment, a history of interactions with the user 50 is accumulated in an interaction history accumulation unit 13. An interaction history accumulated in the interaction history accumulation unit 13 can be used for updating pieces of interactive knowledge 21A, 21B, and 21D (hereinafter, referred to as "interactive knowledge 21" in a case in which these pieces of interactive knowledge are not required to be distinguished from each other) of the itemized processing unit 12, for example. The interactive processing device 10 according to the first embodiment includes an update unit 14 that updates the interactive knowledge 21 using the interaction history.

Based on the interaction history accumulated in the interaction history accumulation unit 13, the update unit 14 detects an event that fails to determine information to be information of the item corresponding to any one of the itemized processing units 12, and updates the interactive knowledge 21 of the itemized processing unit 12 corresponding to the item so as to be able to determine the information to be the information of the item. Specifically, for example, the interaction history accumulated in the interaction history accumulation unit 13 is presented to an administrator who manages operation of the interactive processing device 10 in a viewable manner. The administrator checks the interaction history, and in a case in which information of a certain item included in the input text is not determined and inquiry is made to the user 50, inputs the information and the item name to the interactive processing device 10. The update unit 14 detects the event described above based on this input from the administrator, and updates the interactive knowledge 21 of the itemized processing unit 12 so that the information input by the administrator can be appropriately acquired by the itemized processing unit 12 having the item name input by the administrator.

The update unit 14 may detect, as the event described above, an interaction pattern as a combination of a response for inquiring whether the candidate having the score that is smaller than the first threshold and equal to or larger than the second threshold is correct, the candidate being output from the interaction control unit 11 to the user 50, and the input text including affirmative expression thereafter from the interaction history accumulated in the interaction history accumulation unit 13, and may update the interactive knowledge 21 of the itemized processing unit 12 that has transmitted the candidate to the interaction control unit 11 so that the score of the candidate included in the interaction pattern can be equal to or larger than the first threshold.

In the interactive processing device 10 according to the first embodiment, the interaction control unit 11 can control the interaction with the user 50 in accordance with an adjustable control parameter. In this case, the control parameter for controlling the interaction with the user 50 is, for example, wording in the response text (friendly, polite, and the like), voice quality and speed of synthetic sound in a case of synthesizing voice of the response text to be output, and the like. By adjusting such a control parameter in accordance with an attribute (age, distinction of sex, and the like) of the user 50 as appropriate, it is possible to implement the interaction that achieves a high level of satisfaction of the user 50. The interactive processing device 10 according to the first embodiment includes a parameter adjustment unit 15 that adjusts the control parameter with which the interaction control unit 11 controls the interaction with the user 50.

The parameter adjustment unit 15 acquires the attribute of the user 50, and adjusts the control parameter described above in accordance with the acquired attribute. For example, the attribute of the user 50 can be acquired by receiving clear designation (for example, an input of an age or distinction of sex) from the user 50. Alternatively, a face image of the user 50 may be photographed by a camera, and the attribute of the user 50 may be estimated by analyzing the face image. The interaction history with the user 50 may be analyzed to estimate general personality (strict, sociable, and the like) of the user 50, and the personality may be included in the attribute of the user 50. It is possible to determine an optimum value of the control parameter corresponding to the attribute of the user 50, for example, by targeting the user 50, who has various attributes, and collecting various types of data such as degrees of satisfaction of the user 50 during interactive processing while changing the value of the control parameter, and statistically processing the collected data.

Figure 9:
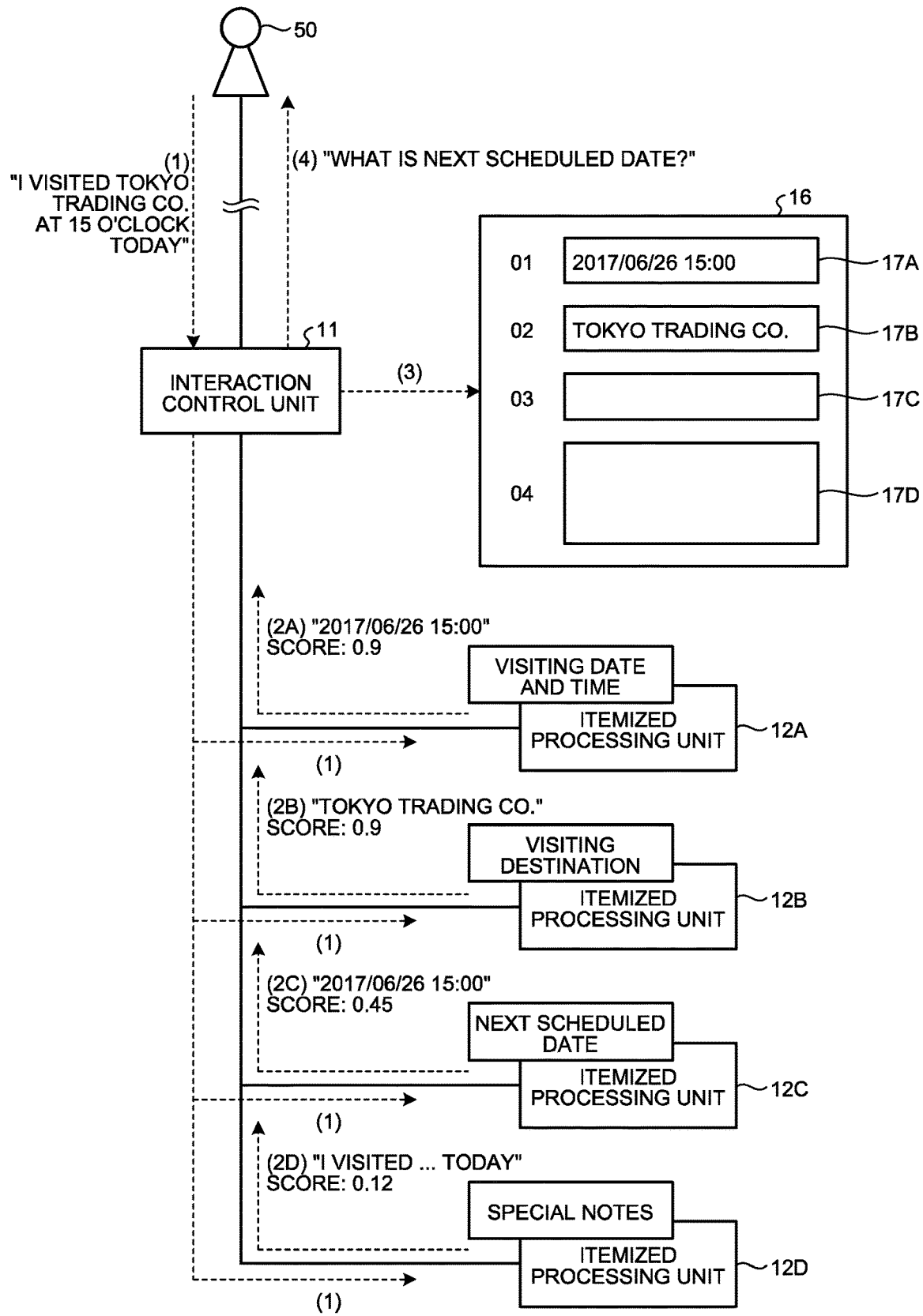
FIG. 9 is a diagram for explaining an operation example of the interactive processing device.

Next, the following describes an operation of the interactive processing device 10 according to the first embodiment configured as described above. FIG. 9 is a diagram for explaining an operation example of the interactive processing device 10 according to the first embodiment, and illustrates an operation example of the interactive processing device 10 in a case in which the user 50 performs an input "I visited Tokyo Trading Company at 15 o'clock today".

The interaction control unit 11 receives the input from the user 50, and transmits the input text "I visited Tokyo Trading Company at 15 o'clock today" to each of the itemized processing units 12 (1). Among the itemized processing units 12, the itemized processing unit 12A corresponding to the item having the item name "visiting date and time" extracts "15 o'clock today" from the input text "I visited Tokyo Trading Company at 15 o'clock today" received from the interaction control unit 11, and converts "15 o'clock today" into "2017/06/26 15:00". A score is calculated by adding 0.2 to the base score of 0.7 based on the calculation rule to be a high value of 0.9 because the input text includes "visit" of the item name 22A and indicates the past date and time by "visited", which matches the condition of the past date and time that is given as the operation parameter 23A.

In this way, the score "15 o'clock today" extracted from "I visited Tokyo Trading Company at 15 o'clock today" results in 0.9, and the score of 0.9 is transmitted to the interaction control unit 11 together with the candidate "2017/06/26 15:00" that is converted from the "15 o'clock today" (2A). It should be noted that a range of the score is from 0 to 1.0, in which the first threshold is 0.9 and the second threshold is 0.7.

Among the itemized processing units 12, the itemized processing unit 12B corresponding to the item having the item name "visiting destination" extracts "visit" and "Tokyo Trading Company" from the input text "I went to Tokyo Trading Company at 15 o'clock today" received from the interaction control unit 11, and calculates the score. The score "visit" is 0.8 because "visit" matches the item name 22B, and the score "Tokyo Trading Company" is calculated to be a high value of 0.9 because "Tokyo Trading Company" is included in the options given as the operation parameter 23B. In this case, the itemized processing unit 12 transmits "Tokyo Trading Company" as the candidate to the interaction control unit 11 together with the score: 0.9 (2B).

Among the itemized processing units 12, the itemized processing unit 12C corresponding to the item having the item name "next scheduled date" extracts "15 o'clock today" from the input text "I visited Tokyo Trading Company at 15 o'clock today" received from the interaction control unit 11 to be converted into "2017/06/26 15:00", and transmits "2017/06/26 15:00" as the candidate to the interaction control unit 11 together with the score: 0.45 (2C). The score "15 o'clock today" is a relatively low value of 0.45 because "15 o'clock today" does not match the condition of a future date and time given as the operation parameter 23C.

Among the itemized processing units 12, the itemized processing unit 12D corresponding to the item having the item name "special notes" extracts, as the candidate, the input text "I visited Tokyo Trading Company at 15 o'clock today" received from the interaction control unit 11 as it is, and transmits the input text to the interaction control unit 11 together with the score: 0.12 (2D). This candidate is not a character string following the item name "special notes", so that the score is a low value of 0.12.

After receiving the candidates and the scores from each of the itemized processing units 12, the interaction control unit 11 determines the candidate having the score equal to or larger than the first threshold to be information of the item corresponding to the itemized processing unit 12 that has transmitted the candidate, and inputs the information to the slot 17 of the corresponding item in the slot table 16 (3). In this example, the score "2017/06/26 15:00" transmitted from the itemized processing unit 12A is 0.95, and the score "Tokyo Trading Company" transmitted from the itemized processing unit 12B is 0.92. Due to this, the interaction control unit 11 determines "2017/06/26 15:00" to be the information "visiting date and time", determines "Tokyo Trading Company" to be the information "visiting destination", inputs "2017/06/26 15:00" to the slot 17A corresponding to "visiting date and time" in the slot table 16, and inputs "Tokyo Trading Company" to the slot 17B corresponding to "visiting destination".

In a case of receiving the candidate having the score that is smaller than the first threshold and equal to or larger than the second threshold, the interaction control unit 11 outputs, to the user 50, a response for inquiring whether the candidate is correct. However, in this example, such a candidate is not received, so that the response for inquiring whether the candidate is correct is not output.

Next, the interaction control unit 11 checks whether all of the slots 17 in the slot table 16 are filled. If there is the slot 17 to which the information is not input, the interaction control unit 11 outputs, to the user 50, a response for inquiring information to be input to the slot 17 (4). In this example, the slot 17C corresponding to "next scheduled date" and the slot 17D corresponding to "special notes" are not filled, so that the interaction control unit 11 outputs, to the user 50, a response "What is the next scheduled date?" for inquiring the information "next scheduled date" to be input to the slot 17C having a smaller item number.

The interactive processing device 10 according to the first embodiment repeats the operation described above until all of the slots 17 in the slot table 16 are filled, and acquires the information of each of the items through the interaction with the user 50 to be input to each of the slots 17 in the slot table 16. When all of the slots 17 are filled, the interaction control unit 11 performs an operation corresponding to the purpose such as "recording a business talk" based on the slot table 16.

Figure 10:
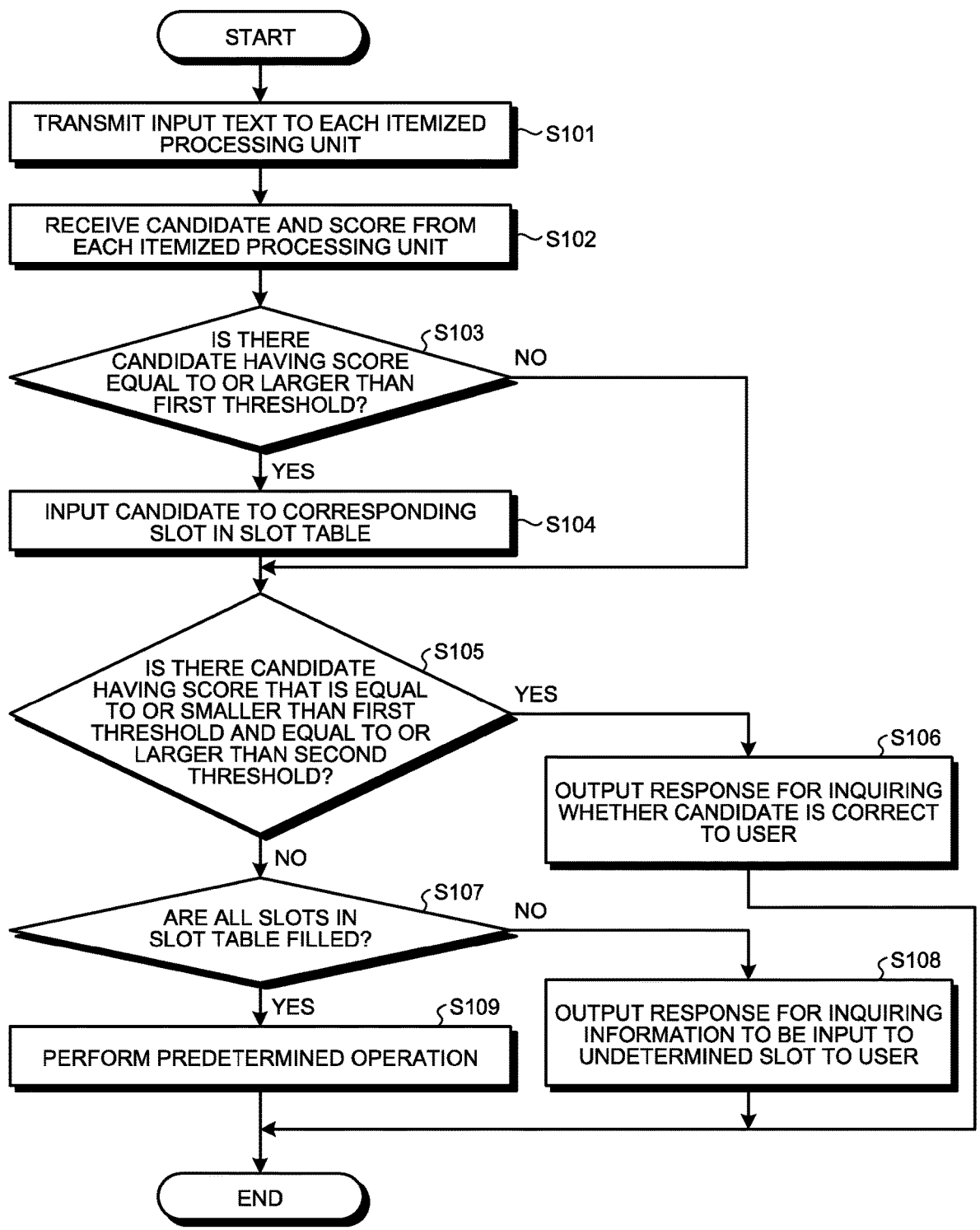
FIG. 10 is a flowchart illustrating an example of a processing procedure performed by the interaction control unit.

FIG. 10 is a flowchart illustrating an example of a processing procedure performed by the interaction control unit 11, and illustrates the processing procedure that is performed by the interaction control unit 11 every time the input from the user 50 is received.

When receiving the input from the user 50, the interaction control unit 11, first, transmits the input text corresponding to the input to each of the itemized processing units 12 (Step S101). The interaction control unit 11 then receives the candidate and the score from each of the itemized processing units 12 (Step S102).

Next, the interaction control unit 11 determines whether there is a candidate having the score equal to or larger than the first threshold in the candidates received from each of the itemized processing unit 12 (Step S103). If there is the candidate having the score equal to or larger than the first threshold (Yes at Step S103), the candidate is input to the corresponding slot 17 in the slot table 16 (Step S104). In contrast, if there is no candidate having the score equal to or larger than the first threshold (No at Step S103), the process proceeds to the next Step S105 without performing the processing at Step S104.

Next, the interaction control unit 11 determines whether there is the candidate having the score that is smaller than the first threshold and equal to or larger than the second threshold in the candidates received from each of the itemized processing units 12 (Step S105). If there is the candidate having the score that is smaller than the first threshold and equal to or larger than the second threshold (Yes at Step S105), the interaction control unit 11 outputs a response for inquiring whether the candidate is correct to the user 50 (Step S106), and ends the series of processing.

In contrast, if there is no candidate having the score that is smaller than the first threshold and equal to or larger than the second threshold (No at Step S105), the interaction control unit 11 determines whether all of the slots 17 in the slot table 16 are filled (Step S107). If there is a slot to which information is not input (No at Step S107), the interaction control unit 11 outputs a response for inquiring information to be input to the undetermined slot 17 to the user 50 (Step S108), and ends the series of processing. In contrast, if all of the slots 17 in the slot table 16 are filled (Yes at Step S107), the interaction control unit 11 performs a predetermined operation corresponding to the purpose using the information input to each of the slots 17 in the slot table 16 (Step S109), and ends the series of processing.

Figure 11:
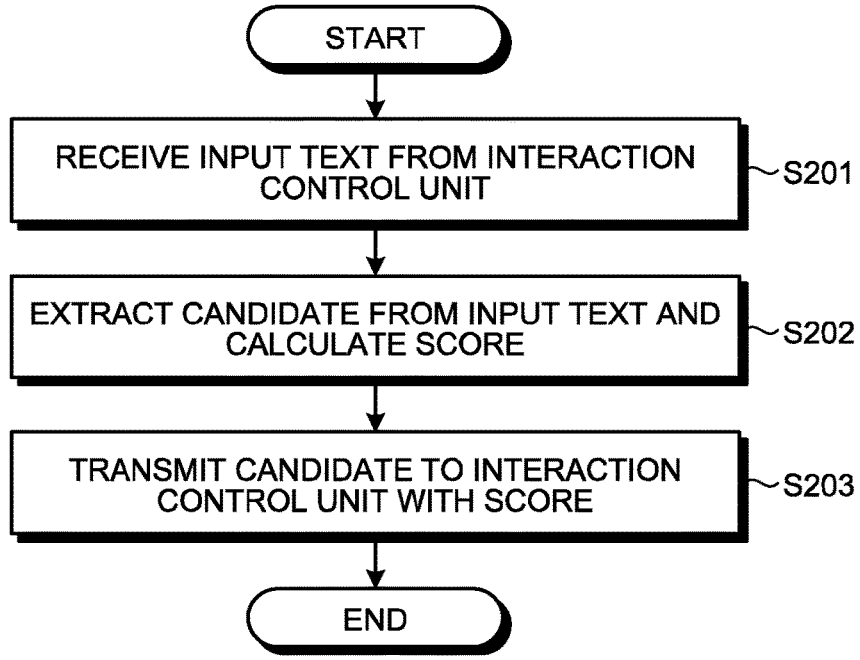
FIG. 11 is a flowchart illustrating an example of a processing procedure performed by the itemized processing unit.

FIG. 11 is a flowchart illustrating an example of a processing procedure performed by the itemized processing unit 12, and illustrates the processing procedure that is performed by the itemized processing unit 12 every time the input text is transmitted from the interaction control unit 11.

When receiving the input text transmitted from the interaction control unit 11 (Step S201), the itemized processing unit 12 extracts the candidate from the input text and calculates the score (Step S202). Next, the itemized processing unit 12 transmits the candidate extracted at Step S202 and the score calculated for the candidate to the interaction control unit 11 (Step S203), and ends the series of processing. The itemized processing unit 12 may divide the input text into pieces of partial text such as a character string in a predetermined unit to be processed. In this case, as the method of division, a method of performing semantic analysis on the input text and partitioning the input text in units of a chunk of meaning can be used, for example. The method of division may be different depending on the type of the information that is to be acquired, and the configuration may be such that the interactive knowledge 21 described above includes a rule for division. The score is calculated for each piece of the divided partial text, a piece of the partial text having the highest calculated score is to be the candidate, and the candidate is transmitted to the interaction control unit 11 with the score.

As described above in detail with the specific examples, the interactive processing device 10 according to the first embodiment implements the interactive processing corresponding to the purpose to be achieved by combining the itemized processing units 12 that are implemented by the customized general-purpose processing units prepared in advance for the respective types of information, and the interaction control unit 11 that organizes the itemized processing units 12. Thus, appropriate interactive processing is enabled to be performed without performing complicated work of devising a large amount of interaction scenarios corresponding to the purpose to be achieved unlike the interactive processing device that performs interactive processing based on interaction scenarios in the related art, and the interactive processing for achieving a predetermined purpose can be implemented with a simple configuration.

The interactive processing device 10 according to the first embodiment has a configuration in which the interaction control unit 11 transmits the input text to all of the itemized processing units 12, and processing for acquiring information for each item is independently performed by each of the itemized processing units 12, so that information of a plurality of items can be acquired at the same time through one time of input from the user 50. That is, although information of only one item can be acquired through one time of input from the user 50 in the related art, information of a plurality of items can be acquired through one time of input from the user 50 in the first embodiment, so that an efficient interaction can be implemented.

First Modification

In the above description, in a case in which the score of the candidate transmitted from the itemized processing unit 12 is smaller than the first threshold and equal to or larger than the second threshold, the interaction control unit 11 creates the response text for inquiring of the user 50 whether the candidate is correct. Alternatively, the itemized processing unit 12 that has transmitted the candidate may create the response text. In this case, in a case in which the score of the candidate extracted from the input text is smaller than the first threshold and equal to or larger than the second threshold, the itemized processing unit 12 transmits the response text for inquiring whether the candidate is correct to the interaction control unit 11 instead of transmitting the candidate and the score to the interaction control unit 11. In a case of receiving the response text from any one of the itemized processing units 12, the interaction control unit 11 outputs, to the user 50, the response text or synthetic sound that is converted from the response text through voice synthesis processing.

Second Modification

In the above description, only for the candidates having the score that is smaller than the first threshold and equal to or larger than the second threshold, whether the candidate is correct is inquired to the user 50. Alternatively, frequency of inquiry may be designated by the user 50. For example, a "standard mode" and a "secure mode" may be provided as operation modes of the interactive processing device 10, whether the candidate is correct may be inquired to the user 50 among the candidates having the score that is smaller than the first threshold and equal to or larger than the second threshold similarly to the example described above in a case in which the "standard mode" is selected by the user 50, and whether the candidate is correct may be inquired to the user 50 among all of the candidates having the score equal to or larger than the second threshold in a case in which the "secure mode" is selected by the user 50. By further adding a "simple mode" as the operation mode of the interactive processing device 10, in a case in which the "simple mode" is selected by the user 50, the candidate having the score that is smaller than the first threshold and equal to or larger than the second threshold may be determined to be the information of the corresponding item without making inquiry to the user 50. The configuration may be such that the threshold for the score may be varied depending on the operation mode selected by the user 50 such that the value of the first threshold is lowered in a case in which the "secure mode" is selected by the user 50, and the value of the second threshold is raised in a case in which the "simple mode" is selected by the user 50. There may be provided a mode for checking whether content that has been lastly input is correct, or a mechanism for checking content to be finally determined irrespective of the selected mode.

Third Modification

The interactive processing device 10 according to the first embodiment may have a configuration including an interactive processing unit for smoothly interacting with the user 50 in addition to the itemized processing units 12 for acquiring the information to be input to each of the slots 17 in the slot table 16. For example, the interactive processing device 10 according to the first embodiment may include an interactive processing unit that makes a response of greeting at the time of starting interactive processing with the user 50. Such an interactive processing unit can be implemented with a mechanism similar to that of the itemized processing unit 12. That is, for example, by giving operation parameters indicating various patterns of greeting to a general-purpose processing unit of a question-and-answer type, it is possible to construct the interactive processing unit that makes a response of greeting at the time of starting interactive processing with the user 50.

Second Embodiment

Next, the following describes a second embodiment. The second embodiment is an example in which an interactive processing system of a multipurpose type is implemented by the combination of a plurality of the interactive processing devices 10 having different purposes to be achieved.

Figure 12:
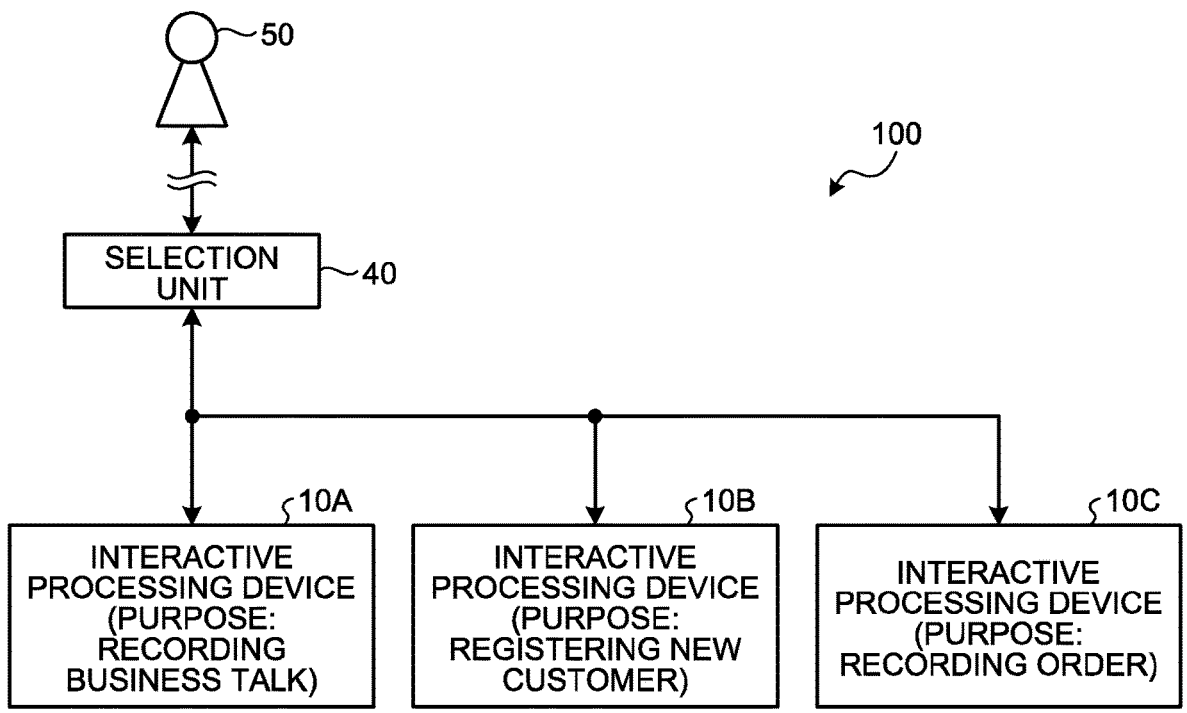
FIG. 12 is a block diagram illustrating an outline of an interactive processing system according to a second embodiment.

FIG. 12 is a block diagram illustrating an outline of an interactive processing system 100 according to the second embodiment. As illustrated in FIG. 12, the interactive processing system 100 includes a plurality of interactive processing devices 10A, 10B, and 10C (hereinafter, referred to as an "interactive processing device 10" in a case in which the interactive processing devices 10A, 10B, and 10C are not required to be distinguished from each other), and a selection unit 40. Each of the interactive processing devices 10 has a configuration similar to that of the interactive processing device 10 according to the first embodiment described above, but the purposes to be achieved (predetermined operations to be performed in accordance with the purpose) thereof are different from each other. In the second embodiment, the interactive processing device 10A is implemented for the purpose "recording a business talk", the interactive processing device 10B is implemented for the purpose "registering a new customer", and the interactive processing device 10C is implemented for the purpose "recording an order".

The selection unit 40 determines a predetermined operation serving the purpose of the user 50 based on the input text corresponding to the input from the user 50, and selects the interactive processing device 10 that interacts with the user 50 from among the interactive processing devices 10. For example, in a case in which the input text corresponding to the input from the user 50 includes a character string specific to "recording a business talk", the selection unit 40 determines that the purpose of the user 50 is "recording a business talk", and selects the interactive processing device 10A corresponding to "recording a business talk" as the interactive processing device 10 that interacts with the user 50. In a case in which the input text corresponding to the input from the user 50 includes a character string specific to "registering a new customer", the selection unit 40 determines that the purpose of the user 50 is "registering a new customer", and selects the interactive processing device 10B corresponding to "registering a new customer" as the interactive processing device 10 that interacts with the user 50. In a case in which the input text corresponding to the input from the user 50 includes a character string specific to "recording an order", the selection unit 40 determines that the purpose of the user 50 is "recording an order", and selects the interactive processing device 10C corresponding to "recording an order" as the interactive processing device 10 that interacts with the user 50.

In a case in which the selection unit 40 cannot determine the predetermined operation serving the purpose of the user 50 based on the input text (for example, in a case in which the input text does not include a character string representing the purpose of the interactive processing device 10), the selection unit 40 transmits the input text to the respective itemized processing units 12 via the interaction control units 11 of all of the interactive processing devices 10 to allow each of the itemized processing units 12 to calculate the score. The interaction control unit 11 of each of the interactive processing device 10 selects the highest score from among scores transmitted from the itemized processing unit 12, and transmits the highest score to the selection unit 40. The selection unit 40 selects the interactive processing device 10 that processes the input text based on the score transmitted from the interaction control unit 11 of each of the interactive processing devices 10. For example, in a case in which the input text is "I visited xx at 15 o'clock", this input text does not include a character string such as "business talk", "new customer", and "order", so that the interactive processing device 10 that is to process this input text cannot be determined. Thus, when the input text is transmitted to each of the interactive processing devices 10, the score of 0.85 for "visiting destination: xx" is transmitted from the interactive processing device 10 for the purpose "recording a business talk" and any other score is not transmitted from the other interactive processing device 10 based on a calculation result of the score obtained by each of the itemized processing units 12, the predetermined operation serving the purpose of the user 50 is estimated to be "recording a business talk", and the interactive processing device 10 for the purpose "recording a business talk" is selected as the interactive processing device 10 that processes the input text. In this case, the selection unit 40 may perform processing of making inquiries such as "Will you input a record of a business talk?" or "Is visiting date and time xxx, and is visiting destination xx?" to the user 50.

As described above, the interactive processing system 100 according to the second embodiment is implemented by the combination of the interactive processing devices 10 having purposes to be achieved different from each other, and each of the interactive processing devices 10 has a configuration similar to that in the first embodiment described above, so that multipurpose interactive processing can be appropriately implemented with a simple configuration without performing complicated work such as devising a large amount of interaction scenarios similar to the interactive processing device 10 according to the first embodiment.

Other Modifications

In the embodiments and the modifications described above, the interactive processing device 10 is configured by combining the itemized processing units 12 and the interaction control unit 11, and the interactive processing system 100 is configured by combining the interactive processing devices 10 and the selection unit 40, but various configurations of the interactive processing device 10 and the interactive processing system 100 can be considered. For example, each of the itemized processing units 12, the interactive processing device 10, and the interactive processing system 100 can be regarded as a component (hereinafter, the itemized processing unit 12 is regarded as a "small agent", the interactive processing device 10 is regarded as a "medium agent", and the interactive processing system 100 is regarded as a "large agent"), and various configurations including the number of hierarchies can be implemented by variously combining the small agent, the medium agent, and the large agent.

In the embodiments and the modifications described above, a simple interaction scenario is exemplified, but it is possible to create a large amount of scenarios or cope with various kinds of interactions by combining the small agent, the medium agent, and the large agent. For example, the medium agent is constituted of a plurality of small agents in the embodiments and the modifications described above. However, in addition to the case of configuring the medium agent with the small agents, depending on a unit of an interaction for achieving the purpose, a configuration may be implemented as a combination of each single agent of the large agent, the medium agent, and the small agent, or a configuration of processing the input from the user 50 only with the small agent may be employed. A configuration for achieving the purpose of interaction can be made by freely combining the agents such that a plurality of small agents are hierarchically configured such that a group of small agents α and a group of small agents β connected to any one of the group of small agents α are included. Not only the combination of the large agent, the medium agent, and the small agent described above, but also a combination of each of the agents and the existing interaction scenario are possible by providing an interface between each of the agents and an existing interaction scenario generated by using another mechanism.

Figure 13:
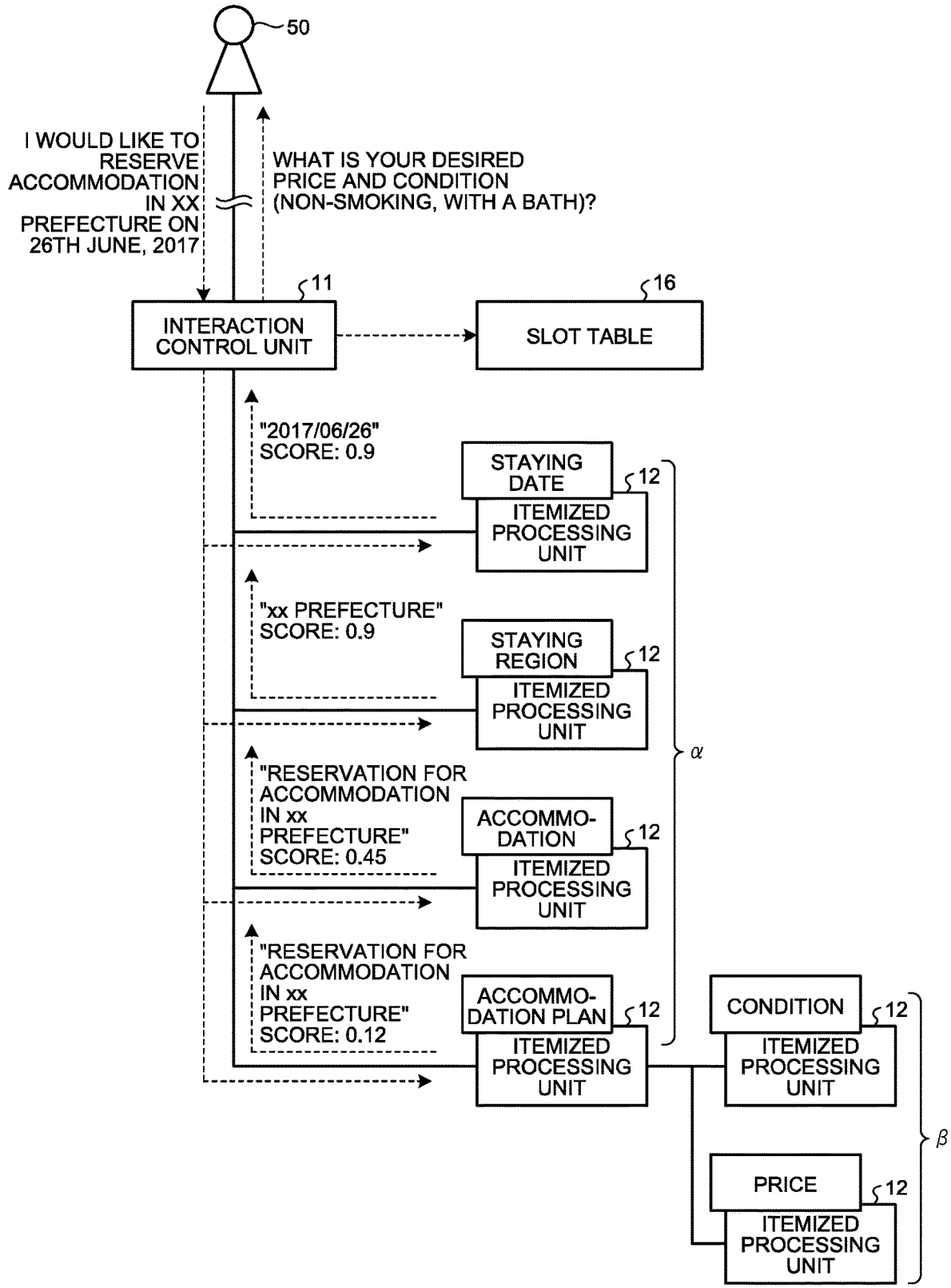
FIG. 13 is a diagram for explaining a configuration example in which a plurality of itemized processing units have a hierarchical structure.

The following describes a simple specific example of various configurations. For example, in a case in which the purpose of the interaction is a greeting, the purpose of interaction is achieved when the agent gives a reply "Hello" in response to the input text (Hello) from the user 50, so that the configuration can be implemented by the small agent (only the first hierarchy) serving as an agent that processes input information from the user 50. Subsequently, a case in which the purpose of interaction is to reserve an accommodation is considered. In this case, for example, the configuration can be implemented by setting the medium agent for the purpose "asking an accommodation plan", but there may be a case in which details of the accommodation plan (for example, a price or a condition (non-smoking, with a bath, and the like)) cannot be obtained because the configuration includes only the medium agent and the small agents as illustrated in FIG. 9. Such a case, as illustrated in FIG. 13 for example, can be coped with by using groups of small agents (itemized processing units 12) a and 0 having a hierarchical structure. The configuration can be implemented such that one of the group of small agents α is the small agent for selecting a plan, an answer for an optional plan can be obtained again from the user 50 via the medium agent when a response "What is your desired price and the condition (non-smoking, with a bath)?" is made by the small agent, and the plan selected by the small agent among the group of small agents β is processed as determined information. In this way, interactive processing corresponding to various purposes can be implemented by combining various agents depending on the purpose of interaction.

Supplementary Explanation

For example, the interactive processing device 10 according to the first embodiment and the interactive processing system 100 according to the second embodiment can be implemented by cooperation of hardware constituting a typical computer and a computer program (software) executed by the computer. For example, when a predetermined computer program is executed by the computer, it is possible to implement functional constituent elements constituting the interactive processing device 10 such as the interaction control unit 11, the itemized processing units 12A to 12D, the update unit 14, and the parameter adjustment unit 15 described above, and functional constituent elements constituting the interactive processing system 100 such as the interactive processing devices 10A to 10C and the selection unit 40. The interaction history accumulation unit 13 and the like described above can also be implemented by using a mass storage device included in the computer.

Figure 14:
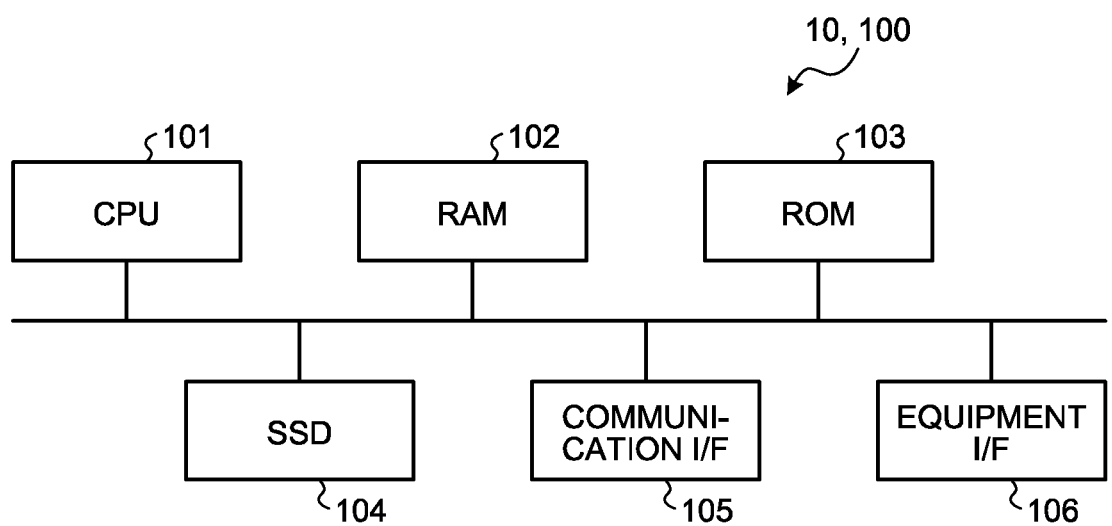
FIG. 14 is a block diagram illustrating a hardware configuration example of the interactive processing device according to the first embodiment and the interactive processing system according to the second embodiment.

FIG. 14 is a block diagram illustrating a hardware configuration example of the interactive processing device 10 according to the first embodiment and the interactive processing system 100 according to the second embodiment described above. As illustrated in FIG. 14 for example, the interactive processing device 10 and the interactive processing system 100 can be implemented by using a hardware configuration as a typical computer including a hardware processor (processor circuit) such as a CPU 101, a storage device such as a RAM 102 and a ROM 103, a mass storage device such as an SSD 104, a communication I/F 105 that communicates with the outside via a network, and an equipment I/F 106 for making a connection with peripheral equipment.

In this case, the computer program described above is recorded and provided in a magnetic disc, an optical disc, a semiconductor memory, or a recording medium equivalent thereto, for example. The recording medium for recording the computer program may have any storage format so long as the recording medium can be read by the computer system. The computer program described above may be installed in the computer in advance, or the computer program described above distributed via a network may be installed in the computer as appropriate.

The computer program executed by the computer describe above has a module configuration including units such as the interaction control unit 11, the itemized processing units 12A to 12D, the update unit 14, and the parameter adjustment unit 15 described above, or including units such as the interactive processing devices 10A to 10C and the selection unit 40. The respective units described above are generated on a main memory such as the RAM 102 when a processor reads out and executes the computer program as appropriate.

The interactive processing device 10 according to the first embodiment and the interactive processing system 100 according to the second embodiment described above may have a configuration in which part or all of the functional units described above are implemented by dedicated hardware such as an application specific integrated circuit (ASIC) or a field-programmable gate array (FPGA).

The interactive processing device 10 according to the first embodiment and the interactive processing system 100 according to the second embodiment described above may be configured as a network system to which a plurality of computers are connected in a communicable manner, and may implement the respective units described above to be distributed to the computers. Alternatively, the interactive processing device 10 according to the first embodiment and the interactive processing system 100 according to the second embodiment described above may be a virtual machine that operates on a cloud system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An interactive processing device configured to acquire information of one or more items for performing a predetermined operation through an interaction with a user, the interactive processing device comprising:
    one or more hardware processors configured to function as:
        one or more itemized processing units corresponding to the one or more items, respectively; and
        an interaction control unit configured to control the interaction with the user collaboratively with the one or more itemized processing units, wherein
    the interaction control unit transmits input information corresponding to an input from the user to each of the one or more itemized processing units,
    each of the one or more itemized processing units extracts a candidate for information that is to be acquired by the each itemized processing unit from the input information received from the interaction control unit, and transmits the extracted candidate to the interaction control unit with information indicating a degree of likelihood that the extracted candidate is the information that is to be acquired, the interaction control unit determines, among a plurality of candidates received from each of the one or more itemized processing units, a candidate having the degree of likelihood that satisfies a first threshold as information of an item corresponding to the itemized processing unit that has transmitted the candidate having the degree of likelihood that satisfies the first threshold, and when there is an item of undetermined information, outputs, to the user, a response for inquiring the information of the item, and each of the one or more itemized processing units is implemented by a general-purpose processing unit given an item name of a corresponding item and an operation parameter that determines an operation of the each itemized processing unit, the general-purpose processing unit having a basic rule for extracting the candidate and calculating the degree of likelihood based on interactive knowledge corresponding to a type of the information that is to be acquired.

2. The interactive processing device according to claim 1, wherein, in a case of receiving a candidate having the degree of likelihood that does not satisfy the first threshold and satisfies a second threshold differing from the first threshold from among the one or more itemized processing units, the interaction control unit outputs, to the user, a response for inquiring whether the candidate having the degree of likelihood that does not satisfy the first threshold and satisfies the second threshold is correct.

3. The interactive processing device according to claim 1, wherein, when information required for performing the predetermined operation is determined among the one or more items, the interaction control unit performs the predetermined operation based on the determined information of the item.

4. The interactive processing device according to claim 1, wherein the one or more hardware processors are configured to further function as:

an interaction history accumulation unit configured to accumulate a history of interactions with the user; and an update unit configured to detect an event that fails to determine information as information of an item corresponding to any of the one or more itemized processing units based on the history, and update the interactive knowledge of the itemized processing unit corresponding to the item to enable the information to be determined as the information of the item.

5. The interactive processing device according to claim 1, wherein the one or more hardware processors are configured to further function as:

an interaction history accumulation unit configured to accumulate a history of interactions with the user, wherein, when it is determined that the input information includes information that is to be determined as information of any of the one or more items based on the history, the interaction control unit determines information extracted from the input information as the information of the item without transmitting the input information to the itemized processing unit corresponding to the item.

6. The interactive processing device according to claim 2, wherein the one or more hardware processors are configured to further function as:

an interaction history accumulation unit configured to accumulate a history of interactions with the user, wherein, when it is determined that the input information includes information that is to be determined as information of any of the one or more items based on the history, even when the degree of likelihood of a candidate received from the itemized processing unit corresponding to the item does not satisfy the first threshold and satisfies the second threshold, the interaction control unit determines the candidate received from the itemized processing unit corresponding to the item that does not satisfy the first threshold and satisfies the second threshold as the information of the item without outputting, to the user, a response for inquiring whether the candidate received from the itemized processing unit corresponding to the item that does not satisfy the first threshold and satisfies the second threshold is correct.

7. The interactive processing device according to claim 1, wherein the one or more hardware processors are configured to further function as:

a parameter adjustment unit configured to acquire an attribute of the user, and adjust a control parameter with which the interaction control unit controls an interaction with the user in accordance with the acquired attribute.

8. An interactive processing system comprising:

a plurality of interactive processing devices according to claim 1, the predetermined operations of which are different from each other; and a selection unit configured to determine the predetermined operation aimed at by the user based on the input information, and select the interactive processing device corresponding to the predetermined operation.

9. An interactive processing device configured to acquire information of one or more items for performing a predetermined operation through an interaction with a user, the interactive processing device comprising:

one or more hardware processors configured to function as:

one or more itemized processing units corresponding to the one or more items, respectively; and an interaction control unit configured to control the interaction with the user collaboratively with the one or more itemized processing units, wherein the interaction control unit transmits input information corresponding to an input from the user to each of the one or more itemized processing units, each of the one or more itemized processing units extracts a candidate for information that is to be acquired by the each itemized processing unit from the input information received from the interaction control unit, and transmits the extracted candidate to the interaction control unit together with information indicating that the extracted candidate is the information that is to be acquired, the interaction control unit determines, among a plurality of candidates received from each of the one or more itemized processing units, a candidate for which the information indicating that the candidate is the information that is to be acquired satisfies a first threshold as information of an item corresponding to the itemized processing unit that has transmitted the candidate for which the information indicating that the candidate is the information that is to be acquired satisfies the first threshold, and when there is an item of undetermined information, outputs a response for inquiring the information of the item to the user, and each of the one or more itemized processing units has a rule for extracting the candidate and deriving the information indicating that the candidate is the information that is to be acquired based on interactive knowledge corresponding to a type of the information that is to be acquired, each of the one or more itemized processing units being implemented with an item name of a corresponding item and information determining an operation of the each itemized processing unit being given.

* * * * *